United States Patent [19]

Someya

[11] Patent Number: 4,781,841

[45] Date of Patent: Nov. 1, 1988

[54] HEAVY METAL ADSORBING AGENT AND METHOD OF USING SAME

[75] Inventor: Nobuo Someya, Tokyo, Japan

[73] Assignee: Nissho Co., Ltd., Tokyo, Japan

[21] Appl. No.: 34,743

[22] Filed: Apr. 6, 1987

Related U.S. Application Data

[63] Continuation-in-part of Ser. No. 909,825, Sep. 19, 1986, abandoned.

[30] Foreign Application Priority Data

Dec. 20, 1985 [JP] Japan ............................. 60-287220

[51] Int. Cl.$^4$ ............................................. C02F 1/28
[52] U.S. Cl. ................................... 210/747; 210/751; 210/912; 210/913; 405/128
[58] Field of Search .............. 210/688, 702, 751, 912, 210/747, 913, 769; 405/128, 129

[56] References Cited

U.S. PATENT DOCUMENTS 3,890,225  6/1975  Kajiyama ........................... 210/688
4,255,067  3/1981  Wright ............................... 210/751
4,543,013  9/1985  Wagner et al. .................... 405/128

FOREIGN PATENT DOCUMENTS 0115216  8/1984  European Pat. Off. .
51-19696  6/1976  Japan .
52-56073  5/1977  Japan ................................ 210/747
53-7969   1/1978  Japan .
53-7961   1/1978  Japan .
53-14687  2/1978  Japan .
58-177194 10/1983 Japan .
59-123590 7/1984  Japan .
60-101180 6/1985  Japan .
2128600   5/1984  United Kingdom .

Primary Examiner—Peter Hruskoci
Attorney, Agent, or Firm—Koda and Androlia

[57] ABSTRACT

An agent for adsorbing and preventing leakage of heavy metals in the industrial waste, etc. includes coral sand of 60 mesh or less. The coral sand can be heated in the atmosphere of reduced pressure, vacuum or argon or nitrogen gas, or air dried in order to accelerate activation of coral sand.

5 Claims, 2 Drawing Sheets

HEAVY METAL ADSORBING AGENT AND METHOD OF USING SAME

This is a continuation-in-part of application Ser. No. 909,825, filed Sept. 19, 1986, now abandoned.

BACKGROUND OF THE INVENTION

1. Field of the Invention

The present invention relates to heavy metal adsorbing agent, and more particularly to an agent for adsorbing heavy metals contained in industrial waste so that soil, ground water, rivers, etc. can be prevented from being contaminated by the heavy metals.

2. Prior Art

Today's industrial and technological development causes several problems. One of them is heavy metal pollution derived from industrial waste.

Presently, the amount of industrial waste has significantly increased, and the disposition of industrial waste is one of the most vital issues in the industry. There are several ways to dispose of the industrial waste. One is to bury the waste in the soil and the other is to burn the waste into ash and dump the ash in remote mountains or disposition factories.

However, industrial waste can contain a great amount of heavy metal which can be easily dissolved in water. In this regard, rain contributes to the heavy metals dissolving, and undergound water is thus easily contaminated by the dissolved heavy metals. The underground water flows out with rain and as a result causes industrial pollution in rivers, etc.

One measure presently taken to solve the problem is to remove the contaminated soil and replace it with clean soil. However, the removed soil is still regarded as industrial waste since it contains heavy metals. Thus, the removed soil causes another problem: it is hard to find a place to dispose of it, and the disposal of the contaminated soil is very costly.

An attempt has been made to use zeolite as a heavy metal adsorbing agent so that replacement of contaminated soil with clean soil will no longer be necessary. However, zeolite does not have a high adsorption ratio against the heavy metal ions; therefore, the use of zeolite is not an effective way to prevent heavy metal pollution.

SUMMARY OF THE INVENTION

In view of the above, the inventor of this application conducted several different experiments in order to solve the problems caused by heavy metals.

As a result, the inventor discovered that coral sand has a high adsorption effect of heavy metals contained in the industrial waste.

The inventor further discovered that a substance including coral sand and an aggregation agent is most suitable as an agent for adsorbing heavy metals contained in the soil.

Therefore, the primary object of the present invention is to provide an agent for adsorbing heavy metals which includes coral sand.

In keeping with the principles of the present invention, the objects of this invention are accomplished by using coral sand as an agent for adsorbing heavy metals contained in the industrial waste so that the heavy metals can be prevented from leaking out of contaminated soil.

DETAILED DESCRIPTION OF THE INVENTION

The coral sand used in the present invention is obtained from live corallum (skeleton) of reef-building coral. The coral sand contains calcium carbonate ($CaCO_3$) as a main component (approximately 95%). It also includes magnesium, strontium, sodium, potassium, phosphorus, and chlorine, and a small amount of iron, copper, zinc, manganese, cobalt, and chromium as essential inorganic elements. These elements are accumulated and weathered by the life activities of reef-building coral, which is Coelenterata.

The coral sand is extremely porous. When a piece of coral sand is examined with a microscope, innumerable holes of 10–50 microns in diameter can be observed. The holes open evenly at the edges of the coral sand like the holes of a lotus root. Thus, the coral sand has excellent porosity and an extremely broad surface area.

As seen in the above, since the coral sand has an extremely broad surface area, it can easily adsorb various kinds of heavy metal ions.

As for the relationship between the surface area and the adsorption effect, the broader the surface of the coral sand, the higher the adsorption effect can be. Thus, in the present invention natural coral sand is processed into a fine powder form to increase the surface area. It is preferable to pulverize the coral sand into 60 mesh or less. Further, when the coral sand is washed so that elements such as salt, etc., which stick to the coral sand, is removed, activation of the coral sand can be higher and the heavy metal adsorption effect of the coral sand can be improved.

It is also effective to heat and activate the coral sand up to 200° to 450° C., preferably 250° to 350° C., under reduced pressure, or under a vacuum, or in an argon or nitrogen gas atmosphere. The coral sand can be dried in the air for the same purpose.

The description below demonstrates one of the ways to use the agent of this invention: First, dig a hole where industrial waste will be disposed and place the agent of this invention in the hole. After applying a heat treatment etc. to the industrial waste to convert it into ash, put the ash into the hole. Cover the ash with the agent of this invention. These steps are repeated such that the agent of the invention and the industrial waste in a manner of ash are layered one on top of the other. In this manner, the heavy metal in the industrial waste is adsorbed by the chemical agent of this invention.

Figure 2:
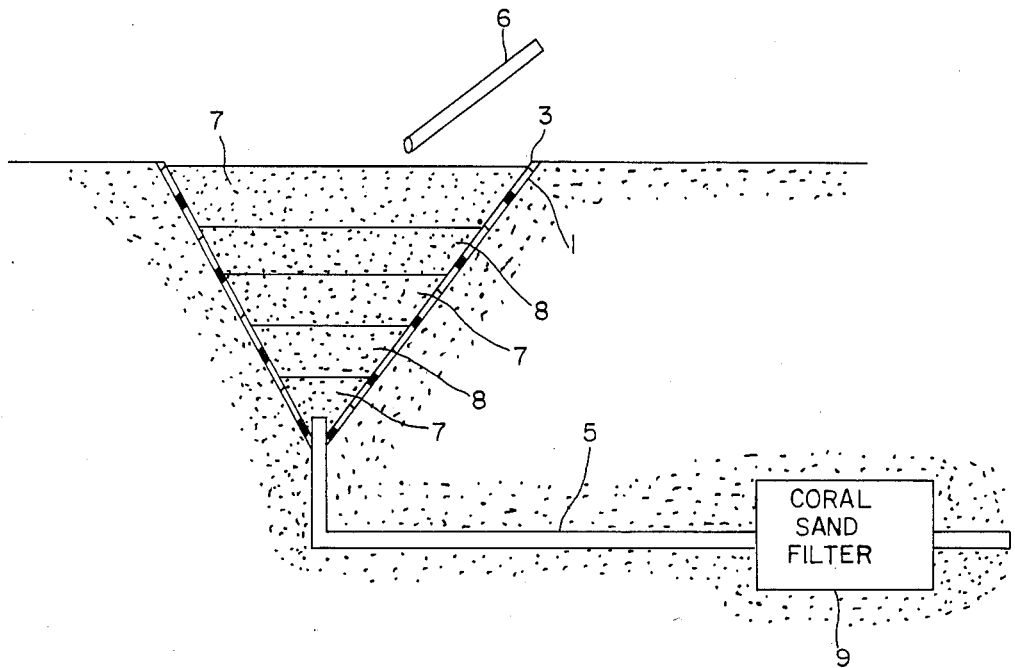
FIG. 2 illustrates an embodiment utilizing the process of the present invention.

Referring to FIG. 2, the description below demonstrates another one of the ways to use the agent of this invention: First, dig a hole 1 in the earth where industrial waste will be disposed and line the hole 1 with a liner made from a water impervious sheet material such as rubber and place the agent 7 of this invention in the hole 1. After applying a heat treatment etc. to the industrial waste to convert it into ash 8, put the ash 8 into the hole 1. Cover the ash 8 with the agent 7 of this invention. These steps are repeated such that the agent 7 of the invention and the industrial waste in a manner of ash are layered one on top of the other. A drain pipe is then provided in the lowest point of the hole 1 and source of water represented by water pipe 6 is provided to run water into the agent 7 and ash 8 which is layered in the hole 1. Accordingly, the water collected in the drain pipe 5 contains almost no heavy metals; however, if further filtering is desired, a coral sand filter 9 can be provided in the drain pipe 5. In addition, the function of the water pipe 6 can be taken over by natural rainfall if desired. In this manner, the heavy metal in the industrial waste is adsorbed by the chemical agent 7 of this invention.

Thus, the soil where the industrial waste is deposited can be cleaned and as a result can be used for various kinds of effective and useful purposes. Since the heavy metal adsorbing agent of the present invention uses natural substance, i.e. coral sand, the cost of disposing of the industrial waste can be kept very low.

In order to prove the adsorption effects of coral sand, tests were conducted to compare it to zeolite.

TEST RESULTS

Prior to the primary comparison test, an analysis of acid soluble heavy metals and heavy metals which can be liquated (liquatable heavy metal) was carried out for the soil collected.

I. Analysis Results for Contaminated Soil

1. Site for Collection and Method Used for the Analysis

The contaminated soil was collected in a housing development located at 3-chome, Hasune, Itabashi-ku, Tokyo, Japan. In particular, nine (9) spots were selected, and after stirring and mixing the soil of 50 cm square and 15 cm deep at each spot, about 1 kg of soil was collected. The soil thus collected was dried by air. Then, the soil was sieved completely by using a 1 mm sieve so that it was ready to be used for later analysis.

2. Acid soluble Heavy Metal Analysis Results

For the nine samples collected, an analysis of acid soluble cadmium (Cd), lead (Pb), zinc (Zn), nickel (Ni), copper (Cu), manganese (Mn), chromium (Cr), mercury (Hg) and arsenic (As) was conducted, respectively.

(i) Method for Analysis:

a. Decomposition of samples: Pb was decomposed by aqua regia-perchloric acid, and the others were all decomposed by mixed three types of acids (perchloric acid:nitric acid:sulfuric acid=20:5:1).

b. Measurement of respective elements: All measurements were conducted by using the atomic absorption method.

However, for background correction, Shimazu's highly sensitive mercury analysis device (MA-610) was used for Hg, Shimazu's highly sensitive arsenic analysis device (ASA-1) was used for As, and a heavy hydrogen lamp was used for all of the other remaining elements.

(ii) Results of Analysis

The results of analysis of the heavy metals which are decomposable by acid obtained from the nine samples are as shown in Table 1.

TABLE 1

Analysis Results for Heavy Metals Decomposable by Acid
Unit: ppm per dry soil

|   | Cu   | Zn  | Mn   | Cr   | Cd   | Pb   | Hg   | Ni   | As   | pH   |
|---|------|-----|------|------|------|------|------|------|------|------|
| 1 | 142  | 599 | 980  | 63.6 | 2.7  | 472  | 0.81 | 40.0 | 9.5  | 5.05 |
| 2 | 141  | 721 | 647  | 164  | 3.2  | 1367 | 1.11 | 53.0 | 15.2 | 5.44 |
| 3 | 151  | 657 | 906  | 74.2 | 6.4  | 3058 | 0.61 | 45.1 | 11.9 | 5.59 |
| 4 | 99.5 | 310 | 647  | 58.9 | 1.6  | 398  | 0.89 | 34.0 | 6.5  | 6.23 |
| 5 | 134  | 367 | 799  | 70.2 | 1.1  | 405  | 1.21 | 39.4 | 8.5  | 7.38 |
| 6 | 99.2 | 267 | 932  | 49.1 | 1.09 | 39.9 | 0.23 | 34.9 | 8.8  | 8.63 |
| 7 | 108  | 567 | 856  | 348  | 48.7 | 1616 | 0.04 | 35.8 | 7.1  | 6.45 |
| 8 | 111  | 594 | 653  | 86.4 | 9.7  | 568  | 1.44 | 28.6 | 7.0  | 7.13 |
| 9 | 285  | 662 | 1565 | 153  | 5.3  | 466  | 1.61 | 50.4 | 18.2 | 4.87 |

3. Results of Analysis of Liquefactive (water soluble) Heavy Metals

For the nine samples collected, the analysis for the heavy metals which can be eluted (liquated or water soluble) was conducted.

The nine types of elements subjected to the analysis were the same as those for the analysis of acid soluble heavy metals.

(i) Method for Analysis a. Extraction of respective heavy metals: 50 ml of distilled water was added to 5.0 g of air-dried soil, and after shaking for four hours, dry-filtration was performed using filter papers (No. 5C). The filtrate thus obtained was used for the test.

b. Measurement of heavy metals: All measurements were conducted using the atomic absorption method. However, Hg, and As were measured by the same methods as that used for the acid soluble heavy metals.

Cd, Pb, and Zn were measured by the direct method using hydrogen-air flame (The background was corrected by the heavy hydrogen lamp).

Mn, Ni, Cu, and Cr were measured by the flameless method (A graphite heating furnace was used) (The background was corrected by the heavy hydrogen lamp).

(ii) Results of Analysis

The results of analysis of the nine types of heavy metals which can be liquated are shown in Table 2.

TABLE 2

Analysis Results for Water Soluble Heavy Metal

|   | pH   | Cu   | Zn   | Mn   | Cr   | Cd   | Pb   | Hg   | Ni   | As   |
|---|------|------|------|------|------|------|------|------|------|------|
| 1 | 7.65 | 0.10 | 0.06 | 0.13 | 0.04 | 0.03 | 0.03 | N.D. | N.D. | N.D. |
| 2 | 7.00 | 0.00 | 0.10 | 0.78 | 0.05 | 0.00 | 0.00 | N.D. | N.D. | N.D. |
| 3 | 7.00 | 0.10 | 0.06 | 0.04 | 0.05 | 0.05 | 0.00 | N.D. | N.D. | N.D. |
| 4 | 7.25 | 0.01 | 0.02 | 0.29 | 0.01 | 0.02 | 0.00 | N.D. | N.D. | N.D. |
| 5 | 7.70 | 0.02 | 0.02 | 0.05 | 0.03 | 0.00 | 0.02 | N.D. | N.D. | N.D. |
| 6 | 7.95 | 0.00 | 0.03 | 0.00 | 0.03 | 0.00 | 0.00 | N.D. | N.D. | N.D. |
| 7 | 8.20 | 0.05 | 0.02 | 0.02 | 0.60 | 0.03 | 0.01 | N.D. | N.D. | N.D. |
| 8 | 8.05 | 0.02 | 0.05 | 0.00 | 0.39 | 0.02 | 0.00 | N.D. | N.D. | N.D. |
| 9 | 8.25 | 0.15 | 0.06 | 0.04 | 0.07 | 0.03 | 0.00 | N.D. | N.D. | N.D. |

Unit: ppm per dry soil
(Note) N.D.:
Hg-0.01 ppm
As-0.01 ppm
Ni-0.1 ppm (iii) Heavy Metal Content in Sample Soil In the analysis results of the acid soluble heavy metals for the nine soil samples, Cr exceeded the pollution criterion [criterion was based upon the full analysis results (the data was provided by the Public Pollution Affairs Section of Ward Office of Itabashi-ku, Tokyo)]

in seven samples except those soil samples labeled No. 1 and 4, Cd exceeded the pollution criterion in sample No. 7, and Pb exceeded the pollution criterion in sample Nos. 2, 3 and 7.

However, the amount of the respective types of heavy metals eluted was very small according to the elution analysis. Except that 0.6 ppm and 0.4 ppm (about 1/10 of the reference value) of Cr was detected in sample Nos. 7 and 8, respectively, the amount of eluted heavy metals was approximately less than one several tenth of the contaminated soil criteriion value in every sample.

It is assumed that most of the heavy metals contained in the soil are present in an insoluble state in water or hardly soluble in water.

II. Test for Comparing the Effects or Coral Sand and Zeolite

At first, it was planned to carry out the above-mentioned test using the most heavily contaminated samples of soil collected from the housing development. However, as mentioned above, only a small amount of eluting heavy metals was detected from each of the samples. Therefore, it was inappropriate to use these soil samples for the test.

Consequently, contaminated soil containing a certain amount of heavy metals which can be liquated was assumed, and the eluted solution obtained by eluting the assumed soil with distilled water was prepared artificially (hereinafter called "artificially contaminated soil extract"). Using this artificially contaminated soil extract, two types of tests were conducted as follows.

1. Shaking Treatment Test (i) Polluted Soil Assumed to Contain the Water Soluble Heavy Metals Ten Times the Quantity of Criterion (by Public Pollution Affairs Section of Itabashi-ku Ward Office in Tokyo) Based on the Elution Analysis for Contaminated Soil As the reference values according to the elution analysis results for contaminated soil, which are set by the Public Pollution Affairs Section of the Ward Office of Itabashi-ku, Tokyo, Hg: 0.05 ppm, Cd: 1.0 ppm, Pb: 10.0 ppm, Cr(VI): 5.0 ppm, As: 5.0 ppm are given.

Based on the above, by assuming the soil contains heavy metals ten times the quantity of the reference value, the artificially contaminated soil extract obtained from the soil assumed as mentioned above was prepared.

Elution was carried out using distilled water ten times the quantity of the soil. The concentrations of the respective heavy metals in the extract obtained were as shown below.

Cu: 10 ppm, Zn: 10 ppm, Mn: 10 ppm, Cr(III): 10 ppm, Cd: 1.0 ppm, Pb: 10 ppm, Hg: 0.05 ppm, As: 5 ppm, pH: 5.00.

As to Cu, Zn, Mn, Cr(III), and Ni, because the reference value is not set, 10.0 ppm the same as that of Pb was applied. Cr(VI) was left out as it was not removed by coral sand (tested previously).

TEST METHOD

Coral sand and zeolite in the amount of 1 g and 2 g were added respectively to 50 ml each of artificially contaminated soil, and the mixtures were left for one night and stirred at intervals. Then, they were shaken for four hours using a shaker.

After measuring the pH of the suspensions, dry-filtration was performed using No. 5C filter paper, and nine types of metals were measured for the filtrates obtained.

The coral sand was supplied by the Bureau of Environmental Protection of the Tokyo Metropolitan Government Office, and zeolite was from a mine in Miyagi prefecture of Japan. The coral sand and zeolite used in the test were ground to be 60 mesh or less in size.

TEST RESULTS

The test results are shown in Table 3. In the Table, the elimination ratio was calculated from the following equation.

Elimination Ratio (%) = A
Concentration of each metal in artificially contaminated soil extract = B
Concentration of each metal in treated filtrate = C $$A(\%) = (B - C) \times (100/B)$$

TABLE 3

Shaking Test Results
Unit: Measured value = ppm
Elimination Ratio = %

| Treating Method | pH | Cd Measured Value | Cd Elimination Ratio | Zn Measured Value | Zn Elimination Ratio | Pb Measured Value | Pb Elimination Ratio | Mn Measured Value | Mn Elimination Ratio | Ni Measured Value |
|---|---|---|---|---|---|---|---|---|---|---|
| Not Treated | 5.00 | 1.00 | — | 10.0 | — | 10.0 | — | 10.0 | — | 10.0 |
| Zeolite | | | | | | | | | | |
| 1.0 g | 5.05 | 0.81 | 19 | 8.34 | 17 | 0.82 | 92 | 8.58 | 14 | 8.61 |
| 2.0 g | 5.10 | 0.76 | 24 | 7.26 | 21 | 0.21 | 98 | 7.67 | 23 | 7.54 |
| Coral sand | | | | | | | | | | |
| 1.0 g | 8.00 | 0.02 | 98 | 0.07 | 99 | 0.00 | 100 | 3.85 | 62 | 4.86 |
| 2.0 g | 8.05 | 0.01 | 99 | 0.00 | 100 | 0.00 | 100 | 1.76 | 82 | 3.63 |

| Treating Method | pH | Ni Elimination Ratio | Cr(III) Measured Value | Cr(III) Elimination Ratio | Cu Measured Value | Cu Elimination Ratio | Hg Measured Value | Hg Elimination Ratio | As Measured Value | As Elimination Ratio |
|---|---|---|---|---|---|---|---|---|---|---|
| Not Treated | 5.00 | — | 10.0 | — | 10.0 | — | 0.050 | — | 5.00 | — |
| Zeolite | | | | | | | | | | |
| 1.0 g | 5.05 | 14 | 0.27 | 97 | 5.35 | 47 | 0.033 | 34 | 4.42 | 12 |
| 2.0 g | 5.10 | 25 | 0.00 | 100 | 4.12 | 59 | 0.030 | 40 | 3.71 | 26 |
| Coral sand | | | | | | | | | | |
| 1.0 g | 8.00 | 51 | 0.00 | 100 | 0.29 | 97 | 0.005 | 90 | 4.03 | 19 |

TABLE 3-continued

Shaking Test Results
Unit: Measured value = ppm
Elimination Ratio = %

| 2.0 g | 8.05 | 65 | 0.00 | 100 | 0.18 | 98 | 0.008 | 84 | 4.09 | 18 |

(ii) Polluted Soil Assumed to Contain the Water Soluble Heavy Metals in Amount Equivalent to Reference Value Based on Elution Analysis Results for Polluted Soil By assuming the contaminated soil containing the water soluble heavy metals in the amount equivalent to the reference value based on the elution analysis results, the artificially contaminated soil extracts containing the respective types of heavy metals as shown below were prepared, and the same shaking test as in (i) was conducted for them.

It was confirmed in the previous test that the effect of zeolite was conspicuously inferior to that of coral sand. In this test, the treated material was limited to coral sand.

TEST METHOD 50 ml of artificially contaminated soil extract containing Cd-1; As-0.5; Hg-0.05; Pb, Zn, Ni, Cu, Mn, Cr(III)-1 each (unit is ppm for all of them), 0.25 g, 0.50 g 0.75 g, and 1.00 g of coral sand of 60 mesh or less in size was added. While stirring at intervals, the respective mixtures were left for one night, then shaken for four hours using a shaker at room temperature.

After measuring the pH of the suspensions (mixtures), dry-filtration was conducted by using the No. 5C filter paper, and each heavy metal in the filtrates thus obtained was measured.

TEST RESULTS

Measured values and the elimination ratios obtained are as shown in Table 4.

For the respective heavy metals, the effect of zeolite is far inferior to that of coral sand.

Coral sand is higher in effectiveness with regard to increasing the pH of the extract.

Cd, Zn, Pb, Cu and Cr can be removed almost completely (95% or above in elimination ratio) with 1.0 g of coral sand when the content is ten times the quantity of the reference value. They can be removed nearly completely by 0.25 g of coral sand when their content is equivalent to the reference value each.

The material in quantity of 0.25 g against 50 ml of the extract corresponds to 5% of the soil in ratio.

With regard to Mn and Ni, when their contents are ten times the reference value each, they cannot be removed by coral sand. When the content is equal to the reference value, at least 30% each of them can be removed by treatment with 0.25 g or more of coral sand.

To Hg, coral sand is more effective than zeolite.

About 10-20% of Arsenic, or As, can be removed by coral sand.

2. Impregnation Test (i) Test Method

A glass column 11 mm in inner diameter is filled with coral sand so that the thickness is 4 cm (that is, 2.0 g each). From the top of the column, the artificially contaminated soil extract [(the solution used in shaking test ii)] prepared by assuming the contaminated soil containing the water soluble heavy metals in a quantity equivalent to the reference value according to the liquation analysis results was dropped. For the treated liquid (about 30 ml was obtained after two days) which flowed down to the bottom portion of the column, nine types of heavy metals were measured.

TABLE 4

Shaking Test Results
Unit: Measured value = ppm
Elimination ratio = %

| Treating Method | pH | Cd Measured Value | Cd Elimination Ratio | Zn Measured Value | Zn Elimination Ratio | Pb Measured Value | Pb Elimination Ratio | Mn Measured Value | Mn Elimination Ratio | Ni Measured Value |
|---|---|---|---|---|---|---|---|---|---|---|
| Not Treated Coral sand | 5.80 | 0.100 | — | 1.00 | — | 1.00 | — | 1.00 | — | 1.00 |
| 0.25 g | 9.15 | 0.001 | 99 | 0.00 | 100 | 0.00 | 100 | 0.10 | 90 | 0.02 |
| 0.05 g | 9.10 | 0.001 | 99 | 0.01 | 99 | 0.00 | 100 | 0.06 | 94 | 0.02 |
| 0.75 g | 9.10 | 0.001 | 99 | 0.00 | 100 | 0.00 | 100 | 0.04 | 96 | 0.01 |
| 1.00 g | 9.00 | 0.001 | 99 | 0.00 | 100 | 0.00 | 100 | 0.03 | 97 | 0.00 |

| Treating Method | pH | Ni Elimination Ratio | Cr(III) Measured Value | Cr(III) Elimination Ratio | Cu Measured Value | Cu Elimination Ratio | Hg Measured Value | Hg Elimination Ratio | As Measured Value | As Elimination Ratio |
|---|---|---|---|---|---|---|---|---|---|---|
| Not Treated Coral sand | 5.80 | — | 1.00 | — | 1.00 | — | 5.00 | — | 0.50 | — |
| 0.25 g | 9.15 | 98 | 0.01 | 99 | 0.01 | 99 | 1.05 | 79 | 0.33 | 34 |
| 0.50 g | 9.10 | 98 | 0.01 | 99 | 0.00 | 100 | 0.73 | 85 | 0.43 | 14 |
| 0.75 g | 9.10 | 99 | 0.00 | 100 | 0.01 | 99 | 0.73 | 85 | 0.39 | 22 |
| 1.00 g | 9.00 | 100 | 0.00 | 100 | 0.01 | 99 | 0.73 | 85 | 0.41 | 18 |

Figure 1:
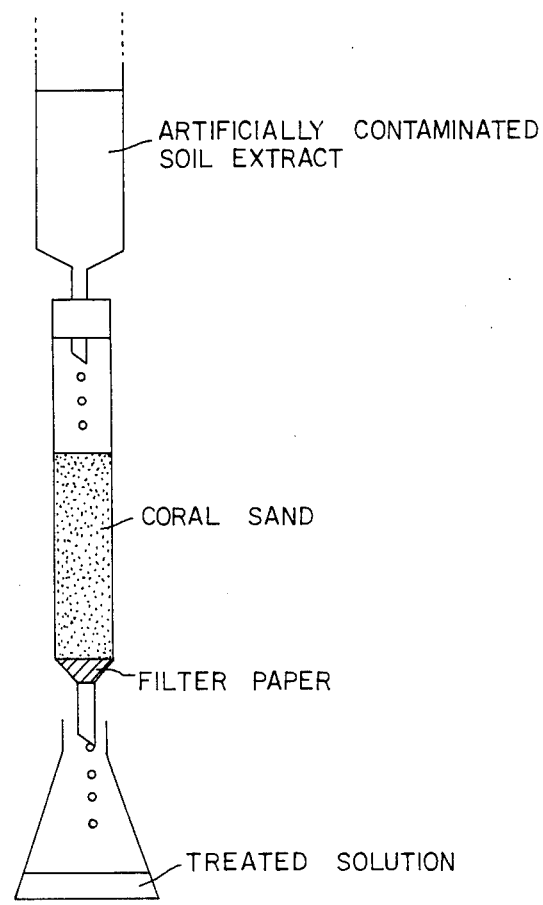
FIG. 1 is a sketch showing the impregnation test apparatus used in the test for the present invention.

The summary of the results obtained by the tests (i) and (ii) are as follows:

In comparison with the shaking test, this test can be regarded as being closer to reality. (The sketch illustrating the test apparatus is shown in FIG. 1.)

(ii) Test Results

The measured values and the elimination ratios obtained for the respective heavy metals are as shown in Table 5.

TABLE 5

Impregnation Test Results
Unit: Measured Value = ppm Elimination Ratio = %

| Samples | pH | Cd Measured Value | Cd Elimination Ratio | Zn Measured Value | Zn Elimination Ratio | Pb Measured Value | Pb Elimination Ratio | Mn Measured Value | Mn Elimination Ratio | Ni Measured Value | Ni Elimination Ratio |
|---|---|---|---|---|---|---|---|---|---|---|---|
| Stock solution | 5.85 | 0.10 | — | 1.00 | — | 1.00 | — | 1.00 | — | 1.00 | — |
| Coral sand | 7.90 | 0.003 | 97 | 0.00 | 100 | 0.05 | 95 | 0.00 | 1.00 | 0.00 | 100 |

| Samples | pH | Cr Measured Value | Cr Elimination Ratio | Cu Measured Value | Cu Elimination Ratio | Hg Measured Value | Hg Elimination Ratio | As Measured Value | As Elimination Ratio |
|---|---|---|---|---|---|---|---|---|---|
| Stock solution | 5.85 | 1.00 | — | 1.00 | — | 5.00 | — | 0.50 | — |
| Coral sand | 7.90 | 0.01 | 99 | 0.02 | 98 | 0.62 | 88 | 0.17 | 66 |

The results obtained are summarized as follows:

A complete removal of Hg and As was not obtained by coral sand.

The remaining five types of heavy metals was removed nearly 100% by coral sand.

III. Summary and Conclusion

As a material for turning the heavy metals to be hardly soluble in water, zeolite is noticeably inferior to coral sand.

Coral sand is highly effective in elevating the pH of the extract from the soil.

With respect to Cd, Pb, Zn, Ni, Mn, Cu, and Cr even from the contaminated soil with elution criteria in their contents, they can be almost completely removal via the covering up treatment with coral sand (60 mesh or less in size) of 4 cm or more in coating thickness.

As mentioned above, the agent according to this invention comprising coral sand has an excellent heavy metal ions adsorbing property. It prevents the heavy metal from leaking out of dump site of industrial waste, and therefore, the ground water and soil can be kept clean. Therefore, it is possible to use the dump site of industrial waste in effective and useful purposes. Further, since the agent of this invention is made of natural substances, the manufacturing cost can be low.

I claim:

1. A method of adsorbing and preventing leakage of heavy metals in a waste material comprising:
providing a hole in the ground, wherein a drain pipe is provided at the lowest portion of the hole for draining water out of said hole;
lining said hole with a water impervious sheeting material; heat treating said waste material to form an ash containing said heavy metals
alternately layering coral sand and said ash in said hole, wherein at least a first layer of coral sand is provided on said sheeting material, at least a layer of said ash is provided on said first layer, and at least a second layer of coral sand is provided on said layer of said ash, wherein sufficient coral sand is provided in said first and second layer to adsorb said heavy metals in said ash; introducing water into said hole; adsorbing said heavy metals with said coral sand to prevent leakage of said heavy metals into said water; and draining water out of said hole through said drain pipe.

2. The method according to claim 1, wherein said coral sand is in the form of a powder.

3. The method according to claim 1, wherein said coral sand is washed to be free salt.

4. The method according to claims 1, 2 or 3, wherein said coral sand is heated in an atmosphere of reduced pressure, vacuum or nitrogen gas, or air dried for activation.

5. The method according to claim 1, wherein a coral said filter is provided in said drain pipe for additional filtering of any water collected in said drain pipe.

* * * * *